(12) United States Patent
Noonan et al.

(10) Patent No.: US 11,071,254 B2
(45) Date of Patent: Jul. 27, 2021

(54) SYSTEM AND METHOD FOR DIRECTING A MODULE WRAP

(71) Applicant: Deere & Company, Moline, IL (US)

(72) Inventors: James T. Noonan, Bondurant, IA (US); Kevin J. Goering, Cambridge, IA (US); Mark A. Cracraft, Johnston, IA (US); Nile T. Ackerman, Swan, IA (US); Justin E. Hummel, Des Moines, IA (US); Jeffrey S. Wigdahl, Ames, IA (US); Robert C. Blad, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 719 days.

(21) Appl. No.: 15/214,052

(22) Filed: Jul. 19, 2016

(65) Prior Publication Data
US 2018/0020620 A1    Jan. 25, 2018

(51) Int. Cl.
*A01D 46/08*    (2006.01)
*A01F 15/07*    (2006.01)

(52) U.S. Cl.
CPC ........ *A01F 15/0715* (2013.01); *A01D 46/084* (2013.01); *A01F 2015/0745* (2013.01); *A01F 2015/0755* (2013.01)

(58) Field of Classification Search
CPC ................ A01F 15/0715; A01F 15/071; A01F 2015/072; A01F 2015/0755; A01F 2015/076; B65B 11/04; B65B 27/125; B65B 41/12; B65B 41/16; B65B 63/04
USPC .... 226/95; 53/397, 441, 465, 587, 556, 210, 53/211, 215, 389.1, 389.2, 389.4, 389.5
See application file for complete search history.

(56) References Cited

U.S. PATENT DOCUMENTS

| | | | | |
|---|---|---|---|---|
| 3,976,237 A | * | 8/1976 | Bossons | B65H 23/24 226/97.3 |
| 4,407,113 A | * | 10/1983 | Core | A01F 15/0715 53/118 |
| 4,529,141 A | * | 7/1985 | McClenathan | B26D 1/425 242/527.1 |
| 4,555,076 A | * | 11/1985 | Uchiyama | G03D 13/001 226/189 |
| 4,580,398 A | * | 4/1986 | Bruer | A01F 15/0705 100/5 |
| 4,608,807 A | * | 9/1986 | Skripalle | B65B 63/04 53/399 |
| 4,729,213 A | * | 3/1988 | Raes | A01F 15/0715 100/15 |
| 4,917,008 A | * | 4/1990 | van den Wildenberg | A01F 15/0715 100/15 |
| 5,115,734 A | * | 5/1992 | Quartaert | A01F 15/0705 100/5 |

(Continued)

*Primary Examiner* — Thanh K Truong
*Assistant Examiner* — Patrick B Fry
(74) *Attorney, Agent, or Firm* — Michael Best & Friedrich LLP

(57) ABSTRACT

A module builder of an agricultural vehicle includes a chamber operable to support and form a product. A wrap is feedable into the chamber through a pinch point, the pinch point partially defined by a rotatable roller. A belt at least partially defines a wrap path. The wrap is configured to move along the wrap path to surround the product in the chamber. A gas flow system and/or a reversing belt is operable to direct the wrap from the pinch point toward the wrap path.

20 Claims, 10 Drawing Sheets

(56) References Cited

U.S. PATENT DOCUMENTS

| | | | | |
|---|---|---|---|---|
| 5,129,207 | A | * | 7/1992 | Butler ................. A01F 15/0715 53/118 |
| 5,129,208 | A | * | 7/1992 | Van Zee ............. A01F 15/0715 53/118 |
| 5,419,253 | A | * | 5/1995 | Campbell ............. A01F 15/141 100/3 |
| 5,433,059 | A | * | 7/1995 | Kluver ................ A01F 15/0715 53/118 |
| H1789 | H | * | 3/1999 | Brown ............................ 34/116 |
| 6,405,914 | B1 | * | 6/2002 | Broom ............... B65G 21/2036 226/170 |
| 2001/0050154 | A1 | * | 12/2001 | Broom .................. B65H 20/10 162/193 |
| 2003/0089756 | A1 | * | 5/2003 | Demers ............... D21G 9/0063 226/95 |
| 2014/0157748 | A1 | * | 6/2014 | Olander ................ A01F 15/106 56/341 |
| 2014/0237981 | A1 | * | 8/2014 | Roberge ................ A01D 87/02 56/341 |
| 2015/0047311 | A1 | * | 2/2015 | Jacobson ........... A01F 15/0715 56/341 |

\* cited by examiner

SYSTEM AND METHOD FOR DIRECTING A MODULE WRAP

BACKGROUND

The present disclosure relates to agricultural equipment, and more particularly to a system and method for directing a module wrap about a module.

SUMMARY

A module builder of an agricultural vehicle includes a chamber operable to support and form a product. A wrap is feedable into the chamber through a pinch point, the pinch point partially defined by a rotatable roller. A belt at least partially defines a wrap path. The wrap is configured to move along the wrap path to surround the product in the chamber. A gas flow system is operable to direct the wrap from the pinch point toward the wrap path.

A method of directing a wrap about a product in a chamber of a module builder of an agricultural vehicle, in which the chamber is at least partially defined by a moving belt, includes introducing the product into the chamber and rotating a roller to feed the wrap in a first direction through a pinch point, which is partially defined by the moving belt. The method further includes actuating a gas flow system to direct the fed wrap in a second direction toward the moving belt, the second direction different than the first direction.

An agricultural vehicle includes an accumulator operable to store a product, a module builder operable to form the product into a module, and a first belt operable to direct the product from the accumulator to the module builder. A second belt is operable to direct the product within the module builder. A wrap is feedable between a pinch point defined by the first belt and the second belt. The first belt is configured to move the wrap through the pinch point in a direction away from the second belt in a first mode of operation and is configured to move the wrap toward the second belt in a second mode of operation.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
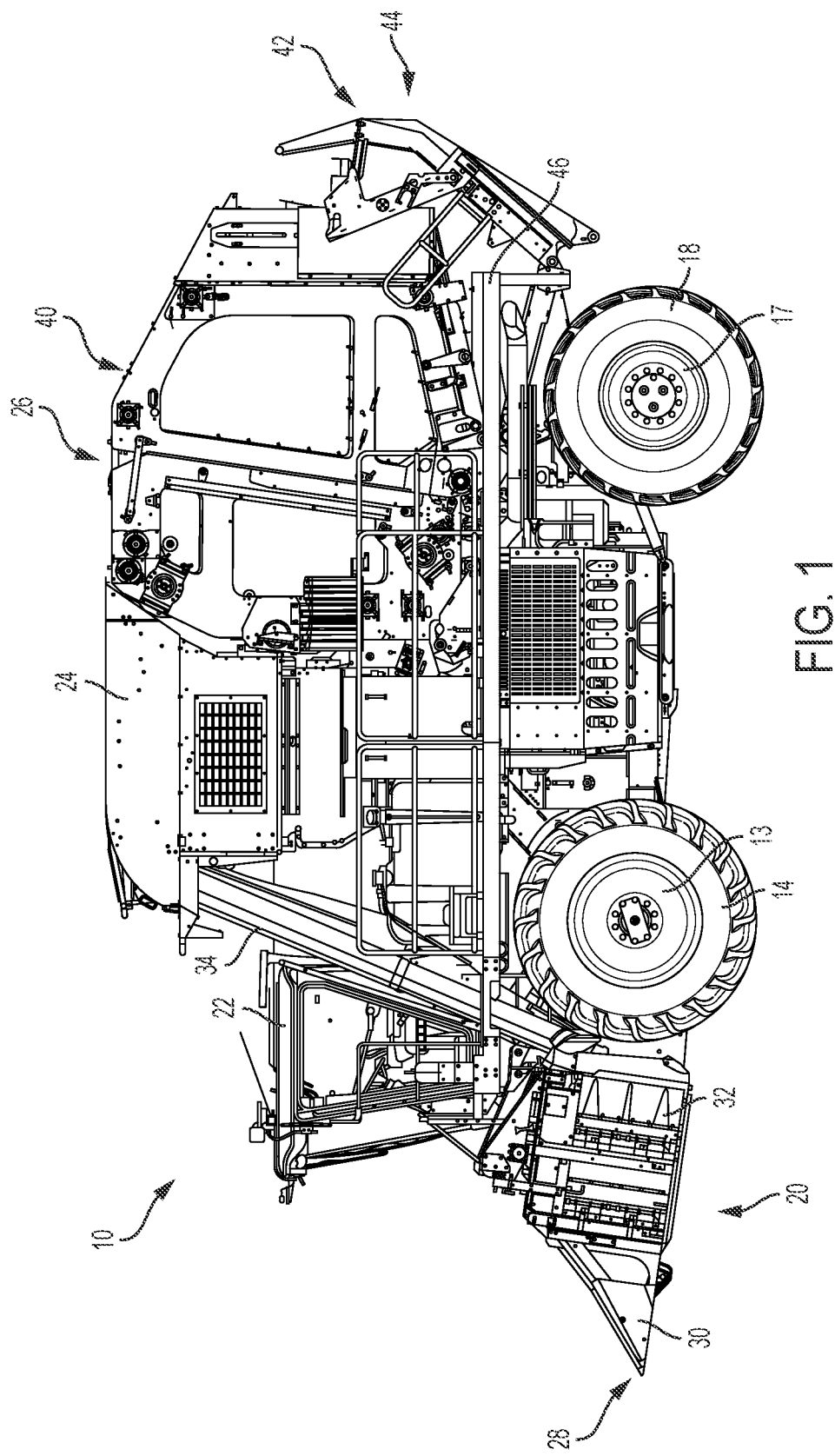
FIG. 1 is a side view of a cotton harvester in a module formation state.

As shown in FIG. 1, an agricultural vehicle such as a cotton harvester 10 is supported by front wheels 13 and front tires 14, rear wheels 17 and rear tires 18. The tires 14, 18 support the harvester 10 and provide a rolling surface for the same. The cotton harvester 10 further includes inline row units 20, an operator cabin 22, an accumulator 24, and a module builder 26 supported by a frame 46.

Figure 2:
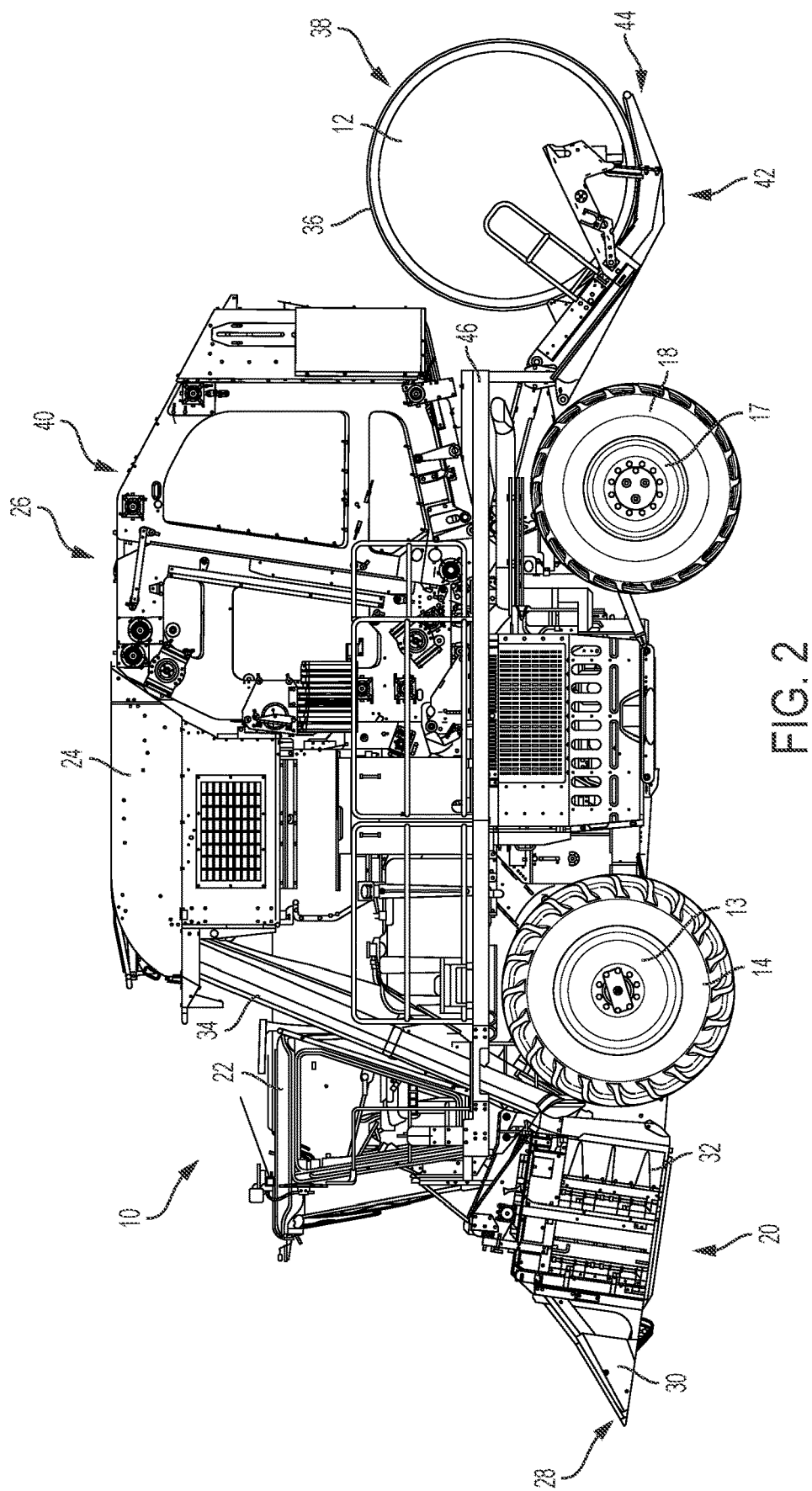
FIG. 2 is a side view of the cotton harvester of FIG. 1 in an outboard module state.

The inline row units 20 are located at a front end 28 of the harvester 10 (as shown to the left of FIG. 1) and include a plurality of picker heads 30 and spindle assemblies 32 spaced apart from one another (extending into the page, oriented with respect to FIG. 1) for picking a product such as cotton and directing it toward the accumulator 24 through chutes 34 associated with each spindle assembly 32. The cotton 12 gathers within the accumulator 24 until beater rolls (not shown) and a belt 56 (FIG. 3) carry the cotton 12 from the accumulator 24 into the module builder 26. When a predetermined amount of cotton 12 is located within the module builder 26, a wrap 36 is fed around the cotton 12 within the module builder 26 to surround the cotton 12 and produce a module 38 (FIG. 2). As shown, the module builder 26 is a round module builder, and the module 38 is a round module (generally cylindrical with a round cross-section) of cotton 12, surrounded by the wrap 36.

Referring to FIGS. 1-2, the module builder 26 includes a cotton processing system 40, which supports the cotton 12 as the module 38 is formed, and a module handling system 42. The module handling system 42, or module handler, is located downstream of the processing system 40 at a rear end 44 of the harvester 10. During operation, the module handling system 42 rotates about the frame 46 of the harvester 10 from a module formation state (FIG. 1) to an outboard module state (FIG. 2) such that a full module 38 exits the processing system 40 and rests upon the module handling system 42. When the harvester reaches the edge of the field, or an alternative location chosen by the operator, the module handling system 42 releases the module 38. The harvester then returns to the module formation state (FIG. 1). It should be noted that the harvester 10 continues to harvest (i.e., the inline row units 20 continue to provide cotton 12 to the accumulator 24) when the harvester 10 is in the outboard module state.

Figure 3:
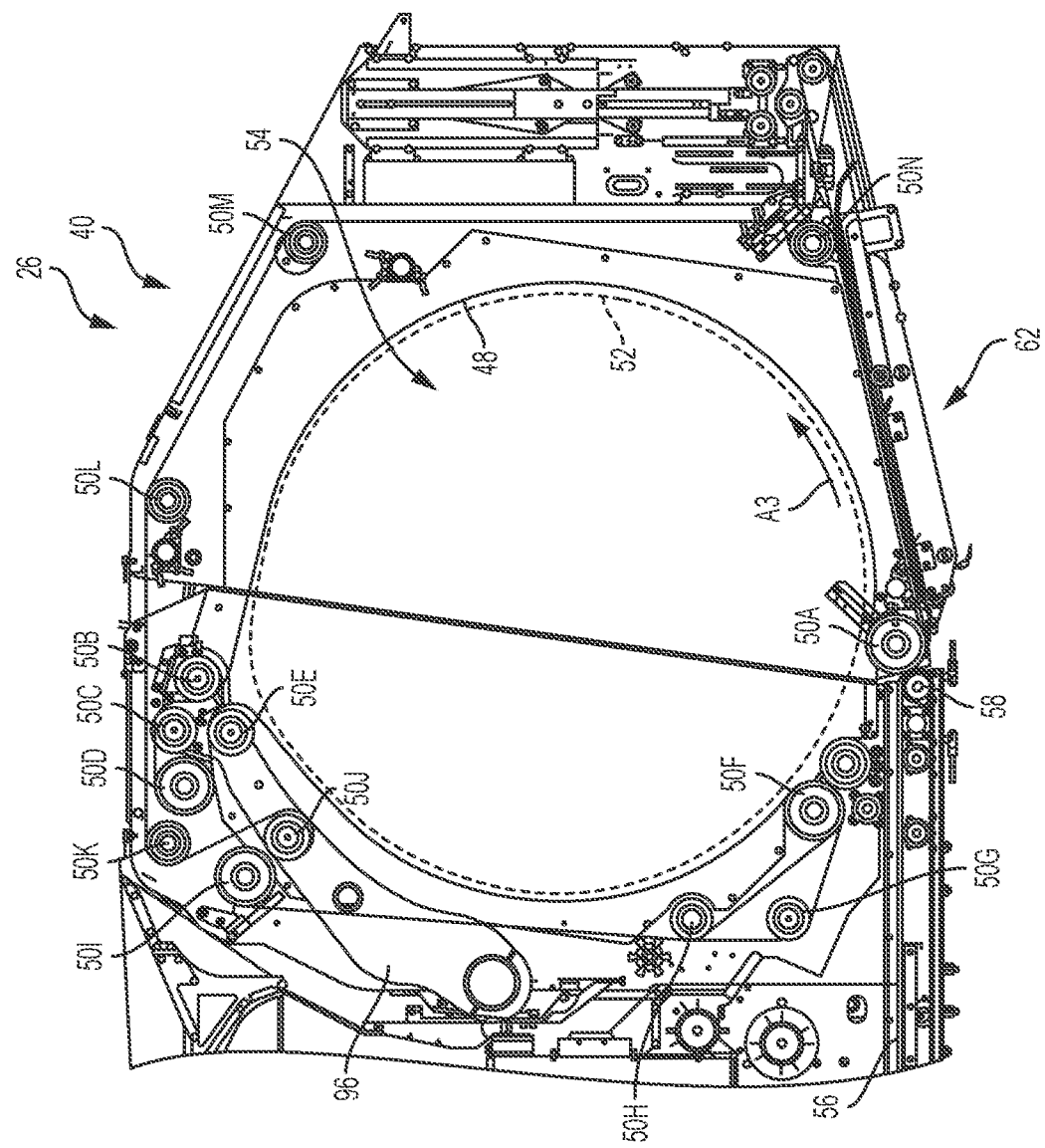
FIG. 3 is a side view illustrating certain internal components of a module builder of the cotton harvester of FIG. 1.

FIG. 3 shows certain internal features of the module builder 26. A belt 48 moves in a loop along and around a plurality of cylindrical rollers 50A-50N. The belt 48 (and each roller 50A-50N) generally has a width (i.e., extending into the page) similar to the width of the module builder (e.g., approximately eight feet, etc.) 26 such that cotton 12 within the module builder 26 remains within the confines of the belt 48. The belt 48 defines a generally circular interior path or wrap path 52 and a chamber 54, the wrap path 52 sized to account for the quantity of cotton within the chamber 54. An arm 96 rotates about a fixed point to vary the size of the wrap path 52 up to a largest size, operable to hold enough cotton for a full module 38 (FIG. 2).

The first roller 50A, a lower rear gate roller, is positioned at the edge of the circular interior path 52, reversing the direction of the belt 48. The second, third, fourth, and fifth rollers 50B-50E support the belt 48 near the uppermost portion of the interior path 52. The sixth roller 50F is positioned at the edge of the circular interior path 52, again reversing the direction of the belt 48. The gap between the first and sixth rollers 50A, 50F forms an opening for cotton 12 to enter the chamber 54 from the infeed belt 56.

The seventh through fourteenth rollers 50G-50N (in alphabetical order) direct the belt 48 back to the first roller 50A, completing the loop without extending through or across the chamber 54. Any of the rollers 50A-50N may be driven (i.e., powered by a motor) to move the belt 48, or may otherwise be passive, not driving the belt 48, but only changing the direction or tensioning the belt. Any of the rollers 50A-50N may be adjustable to vary the tension of the belt 48.

The cotton 12 rotates about the chamber 54 along the rotating belt 48 in a direction designated by arrow A3 (FIG. 3) as the infeed belt 56 provides additional cotton 12. A plurality of fingers 94 (see FIG. 5) directs the cotton 12 in the chamber 54 from the sixth roller 50F back to the first roller 50A across the gap. The belt 48 is slack between the first and second rollers 50A, 50B to allow the cotton 12 to fill the chamber 54.

Figure 4:
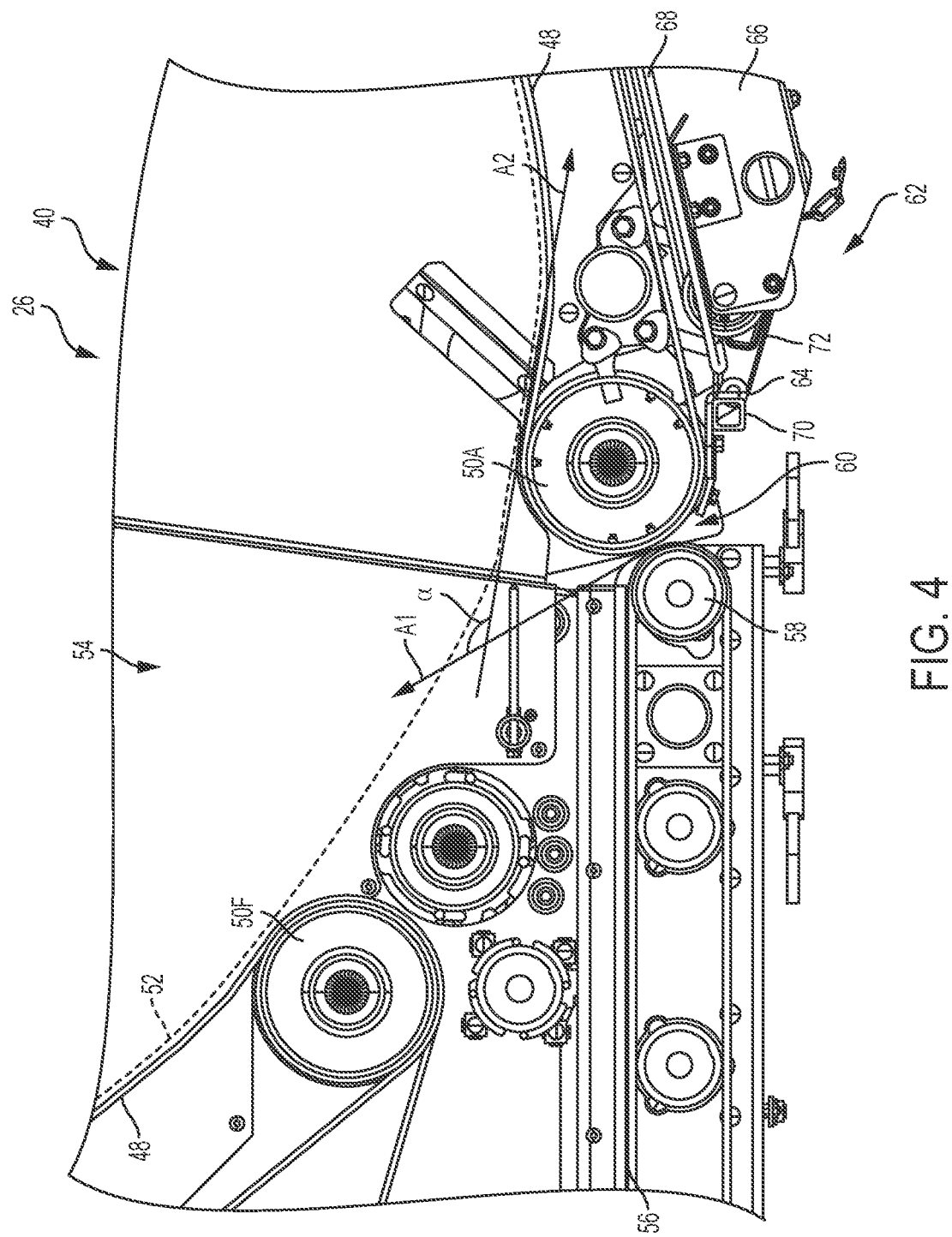
FIG. 4 is a side view of a lower portion of the module builder of FIG. 3 with a wrap transfer assembly in a first state.

As shown more clearly in FIG. 4, the first roller 50A is positioned adjacent the infeed belt 56, and more particularly, is positioned adjacent a rear feed roller 58 of the infeed belt 56. A gap is provided between the two rollers 50A, 58, serving as a pinch point 60 for the wrap 36, described in greater detail below.

Figure 5:
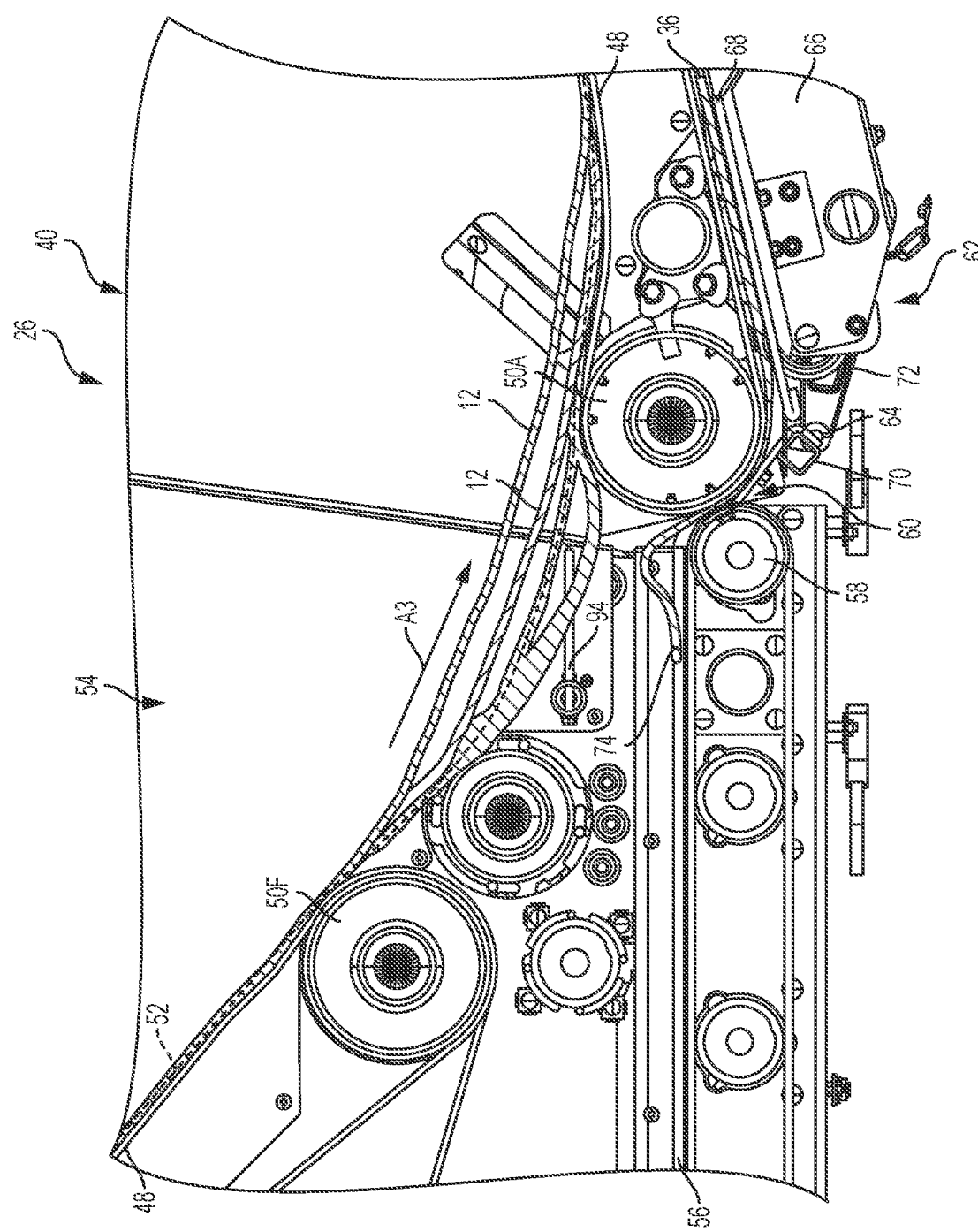
FIG. 5 is a side view of a lower portion of the module builder of FIG. 3 with the wrap transfer assembly in a second state.
Figure 6:
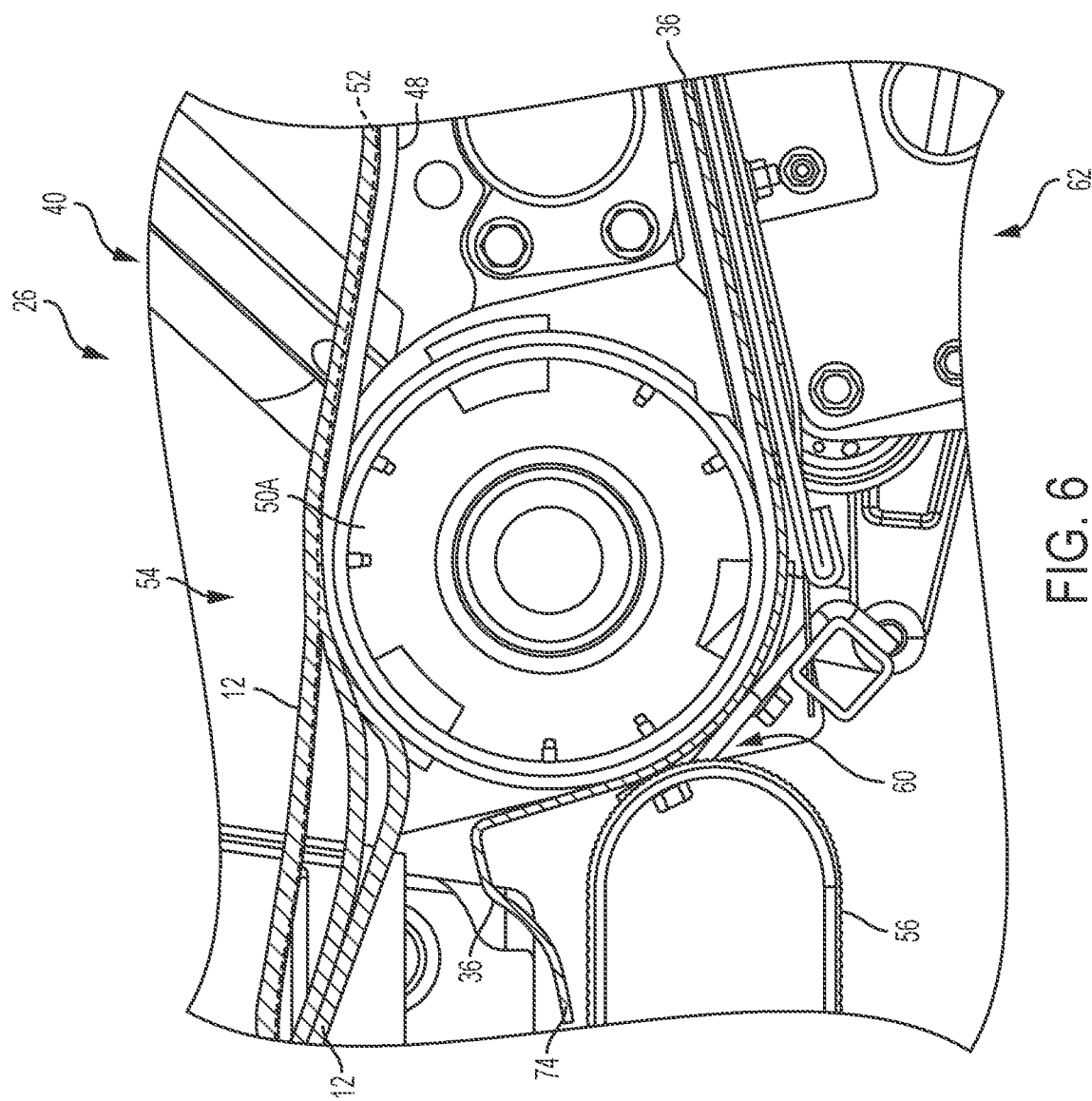
FIG. 6 is a detailed side view of a first roller and a wrap at the lower portion of the module builder of FIG. 3.

A wrap transfer assembly 62 is located below the chamber 54 and includes an L-bracket 64 and a bracket 66 supporting a tray 68. The L-bracket 64 is supported on square tubing 70 and may have a consistent cross-section along the width of the module builder 26 (into the plane of the page in FIGS. 3-10) or may alternatively comprise a plurality of L-brackets spaced along the width of the module builder 26, forming a toothed bracket. The tray 68 likewise extends the width of the module builder 26. The L-bracket 64 and bracket 66 move (e.g., rotate, translate) via the linkage assembly 72 in a swinging motion between a disengaged position (FIG. 4) and an engaged position (FIGS. 5-6). In the disengaged position, the bracket 66 and tray 68 are spaced from the belt 48, between the first and fourteenth rollers 50A, 50N. The gap between the tray 68 and the belt 48 is greater than the thickness of the wrap 36. As shown in FIGS. 5-6, in the engaged position, the bracket 66 and tray 68 move (e.g., rotate, translate, swing) relative to the belt 48 via the linkage assembly 72 such that the gap between the tray 68 and the belt 48 is decreased. The gap between the L-bracket 64 and the belt 48 is likewise decreased to facilitate contact between the wrap 36 and the belt 48.

The wrap 36 may be made of a film material in the form of a thin sheet, or can be made of any other woven or non-woven material suitable for wrapping about modules 38. The wrap 36 may be approximately the width of the module builder 26 (e.g., 96 inches, etc.) or slightly wider (e.g., 106 inches) to extend around the edges of the module 38. The forward edge 74 and the trailing edge (not shown; opposite the forward edge 74) may taper down (e.g., to six feet) to enhance the correct feeding of the wrap portion and maximize the durability of the trailing edge in windy conditions. Each sheet of film may be long enough to wrap around a full module 38 a predetermined number of times (e.g., 3.5 times). A first portion (i.e., closest to the forward edge 74) of the wrap 36 may be provided without an adhesive layer and can be long enough to encompass the module 38. This prevents cotton 12 from sticking to the wrap 36. A second portion of the wrap 36, connected to or continuous from the first portion, may have an adhesive layer to ensure that additional passes around the cotton 12 adhere to the previous pass.

The storage roll of wrap material is located outside of the chamber 54 and is configured to hold enough wrap for multiple modules 38 (e.g., 24 modules). In transit from the storage roll, the wrap passes between the belt 48 and the tray 68, with the wrap transfer assembly 62 in the engaged position to press the wrap 36 against the moving belt 48. The L-bracket 64 similarly guides the wrap 36 into engagement with the moving belt 48, directing the wrap 36 toward the pinch point 60. Once the wrap 36 reaches the pinch point 60, the wrap 36 is directed therethrough, in a direction (indicated by arrow A1; shown on FIG. 4 for clarity) tangent to the mating surfaces of the pinch point 60.

As shown, the roller 50A is driven to move the wrap 36 through the pinch point 60, the roller 50A rotating in a clockwise direction (when viewed from the perspective shown in FIG. 4) to drive the belt 48 from the first roller 50A in a similar direction (indicated by arrow A2). Arrow A2 extends transversely to arrow A1, at an angle α between the arrows A1, A2 greater than ninety degrees. To surround the cotton 12 in the chamber 54, the wrap 36 follows the belt 48 counterclockwise along the wrap path 52, with the forward edge 74 overlapped by the wrap 36 until the film terminates at the trailing end (not shown).

In certain circumstances during operation, the wrap 36 may not follow the roller 50A, the arrow A2, and the wrap path 52, and may become bunched. When bunched, the wrap 36 continues to feed through the pinch point 60 until the rotating cotton 12 grabs the wrap 36 and the motion of the cotton 12 in the chamber 54 directs the wrap along the wrap path 52. When bunched, the wrap 36 is capable of fewer rotations around the cotton 12 in the chamber 54, and may compress the first portion of the wrap 36 such that it does not complete a full rotation around the cotton 12 before transitioning to the adhesive second portion of the wrap 36.

Figure 7:
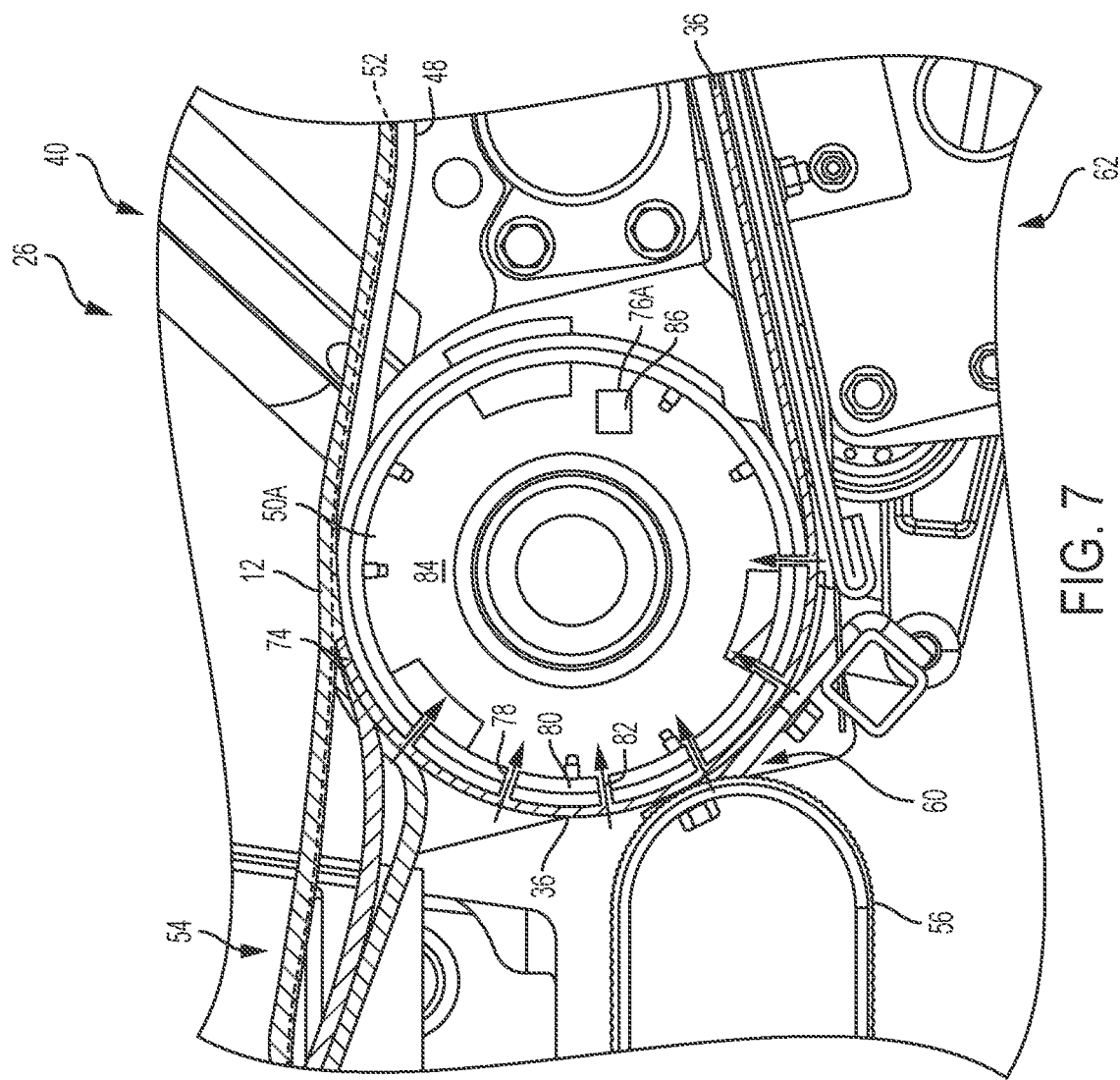
FIG. 7 is a detailed side view of a modified first roller and a wrap at the lower portion of the module builder of FIG. 3.
Figure 8:
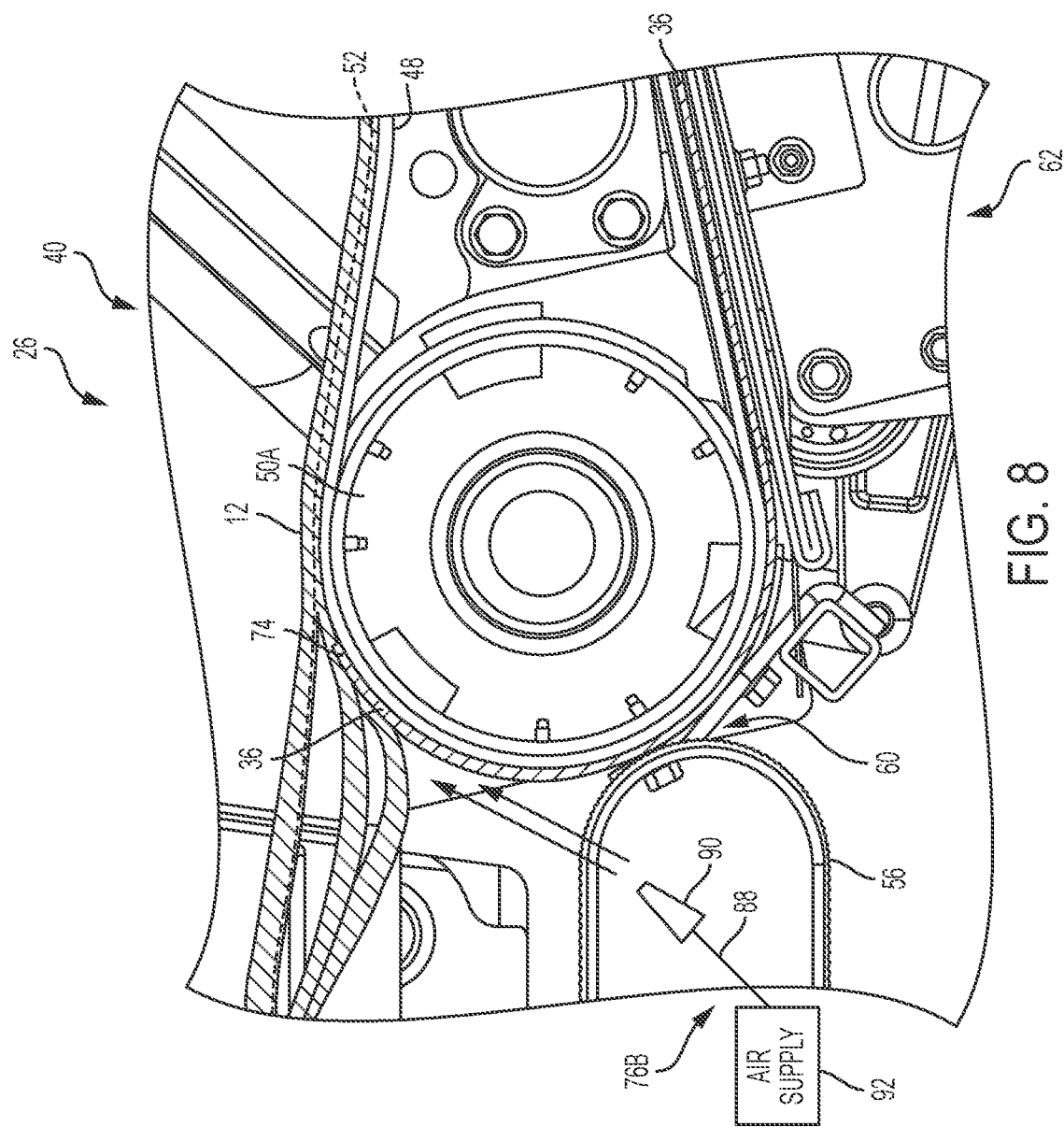
FIG. 8 is another side view of the first roller and wrap of FIG. 6, further including a gas flow system.
Figure 9:
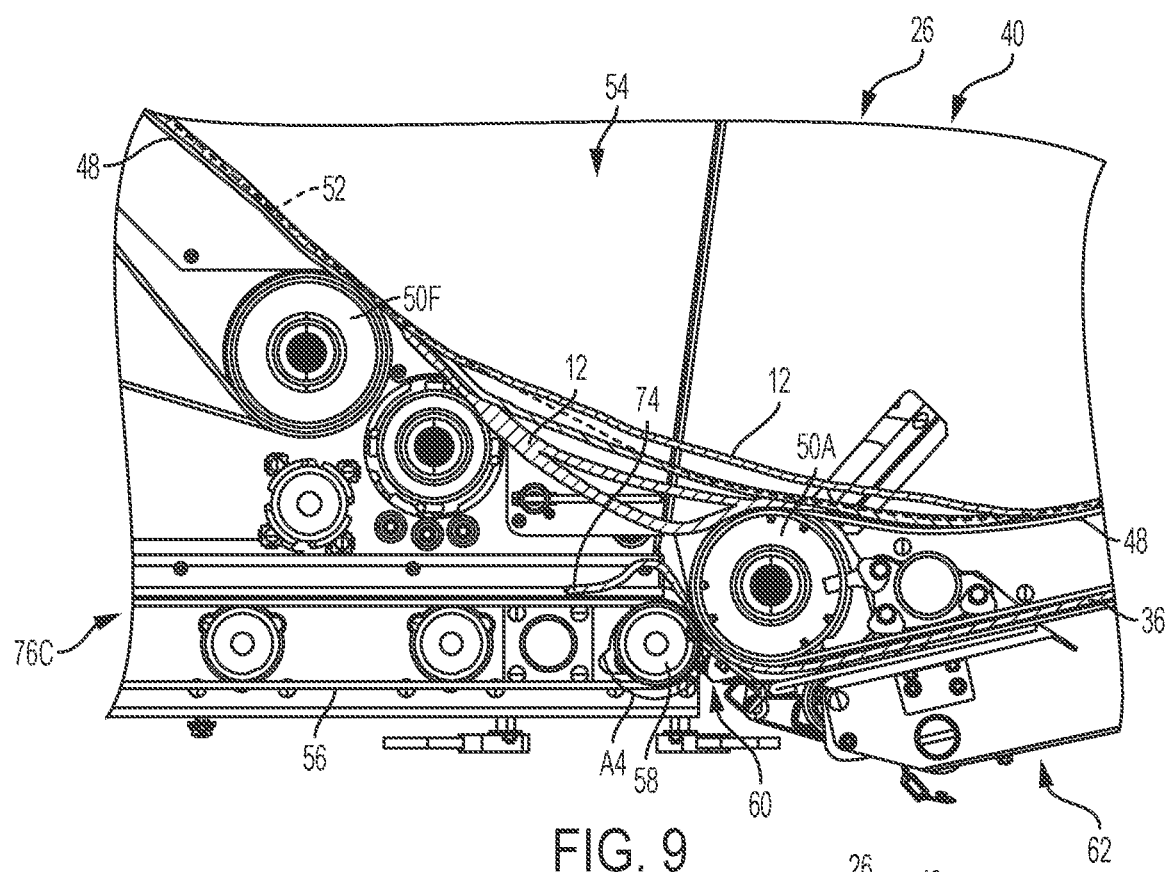
FIG. 9 is a side view of a lower portion of the module builder of FIG. 3 with an infeed belt operating in a first direction.
Figure 10:
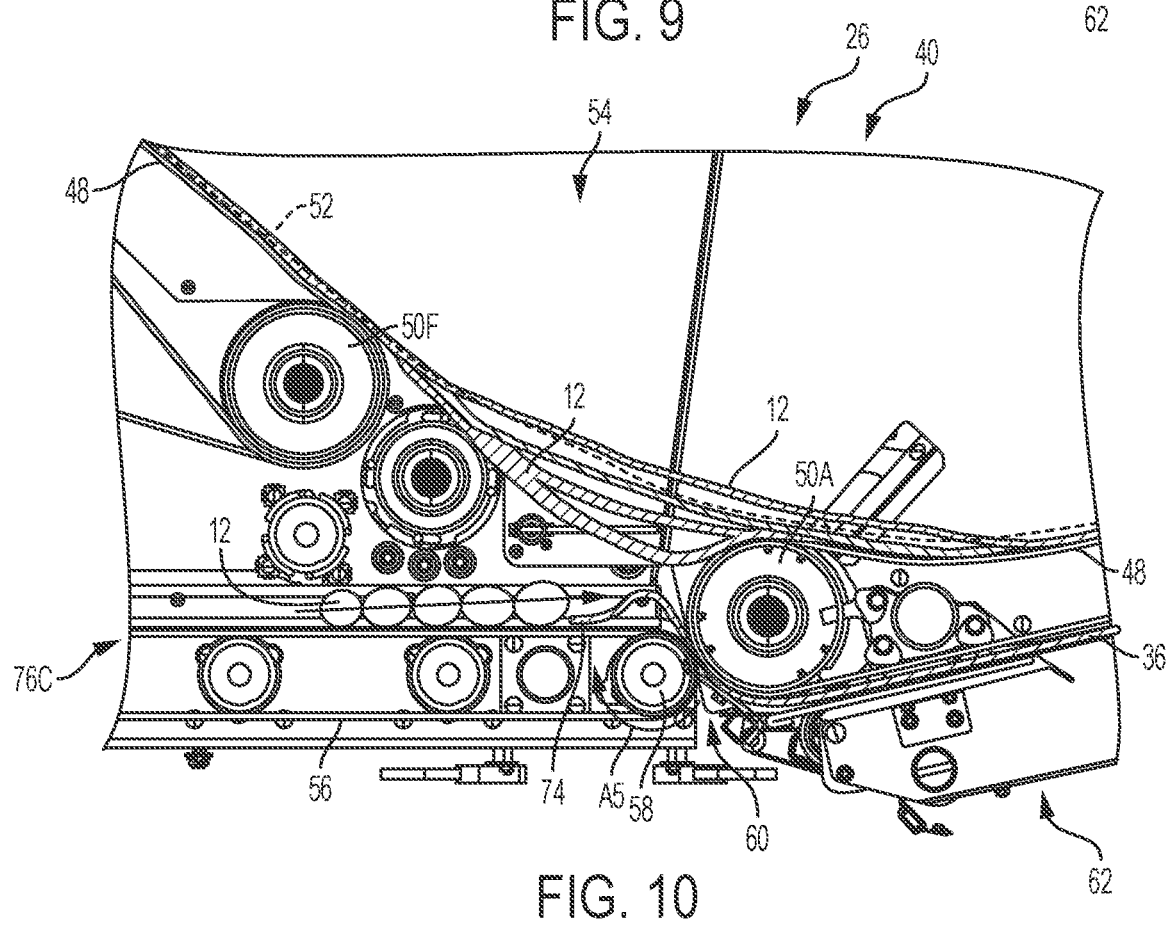
FIG. 10 is a side view of a lower portion of the module builder of FIG. 3 with the infeed belt operating in a second direction.

Due to the orientation of the pinch point 60, and with reference to FIGS. 7, 8, and 9-10, one or more mechanisms 76A, 76B, 76C can be provided to direct the wrap 36 from the pinch point 60 toward the wrap path 52, transitioning the output direction of the wrap 36 from the first direction (arrow A1) to the second direction (arrow A2). As shown, the mechanism may be a gas flow system or device (FIG. 7 or FIG. 8) or may be a motion-based mechanism (FIGS. 9-10).

As shown in FIG. 7, the first roller 50A is modified to include apertures 78 extending through the sidewall 80 of the roller 50A, providing a flow path 82 into an internal chamber 84 of the roller 50A. The internal chamber 84 includes a gas flow system in the form of a vacuum device 76A, shown schematically within the first roller 50A, although the device 76A may alternatively be located outside of the roller 50A, with tubing extending therefrom to the interior chamber 84. The belt 48 may additionally include apertures, or may be made of a gas-permeable material (i.e., to define a gas-permeable portion of the belt 48) to better facilitate the flow of gas (i.e., air), to the apertures 78.

The belt 48 may include a first belt and a second belt, each rotatable around the plurality of rollers 50A-50N. The second belt may be spaced from the first belt to define a gap therebetween, the gap having a width transverse to the motive direction of the belts (i.e., into the page of FIG. 7). The gap is defined by the belt 48 (i.e., specifically defined by the spacing between the two belts) to provide a flow path between the vacuum device 76A and the chamber 54. The gap may directly align with the apertures 78 and belt guides may be utilized to maintain the gap. Using a multi-belt arrangement, the belt 48 may be made of a non-gas-permeable material, with the gap facilitating the flow of gas to the apertures 78. Further, the belt 48 may include additional belts, each spaced apart from adjacent belts via similar gaps.

When the tray 68 moves into the engaged position and the wrap 36 is fed from the storage roll, the first roller 50A is actuated to drive the wrap 36 through the pinch point 60. The vacuum device 76A may be actuated to draw air through the apertures 78 and into the internal chamber 84 of the roller 50A, thereby providing suction when the wrap 36 is fed from the storage roll, or when the tray 68 transitions into the engaged position. The belt 48, tray 68, and L-bracket 64 direct the wrap 36 to the pinch point 60, with the vacuum device 76A providing additional suction to hold the wrap 36 against the belt 48 at the roller 50A.

Due to the suction provided by the vacuum device 76A, as the forward edge 74 of the wrap 36 passes through the pinch point 60, rather than follow the path designated by arrow A1 (FIG. 4), the wrap follows the path of the belt 48 around the roller 50A and to the wrap path 52 (i.e., following arrow A2). The use of the vacuum device 76A therefore reduces the possibility of the wrap 36 bunching prior to engaging the wrap path 52.

Once the forward edge 74 of the wrap 36 is past the roller 50A, the vacuum device 76A may shut off. Alternatively, the vacuum device 76A may remain actuated to draw air continuously as the wrap 36 is fed through the pinch point 60.

As shown in FIG. 8, the module builder 26 may also or instead include a gas flow system 76B, for directing a gas flow (e.g., air) toward the forward edge 74 of the wrap 36 as the forward edge 74 passes through the pinch point 60. The gas flow system 76B includes a gas line 88 and a nozzle 90. The gas line 88 is connected to a gas source 92 such as an air compressor to provide the gas flow through the gas line 88 and out the nozzle 90. The gas flow system 76B is shown schematically with the placement of the nozzle 90, gas line 88, and roller 50A illustrated in an orientation to direct the wrap 36 around the roller 50A. Alternatively, the plurality of fingers 94 (FIG. 5) may be hollow, with an opening at an end nearest the roller 50A, such that the flow of gas is directed toward the first roller 50A (specifically the center of the first roller 50A to influence the tapered leading edge of the wrap 36), in the direction of arrow A2, and through the fingers 94.

When the tray 68 moves into the engaged position and the wrap 36 is fed from the storage roll, the first roller 50A is actuated to drive the wrap 36 through the pinch point 60. The gas flow or air system 76B may be actuated to provide a gas flow when the wrap 36 is fed from the storage roll, or when the tray 68 transitions into the engaged position.

Due to the flow of gas from the system 76B, as the forward edge 74 of the wrap 36 passes through the pinch point 60, rather than follow the path designated by arrow A1 (FIG. 4), the wrap follows the path of the belt 48 around the roller 50A and to the wrap path 52 (i.e., following arrow A2). The use of the gas flow system 76B therefore reduces the possibility of the wrap 36 bunching prior to engaging the wrap path 52.

Once the forward edge 74 of the wrap is past the roller 50A, the gas flow system 76B may shut off. Alternatively, the system 76B may remain actuated to provide a continuous flow of gas as the wrap 36 is fed through the pinch point 60.

As shown in FIGS. 9-10, the module builder 26 may also or instead include an alternative wrap device or mechanism 76C that operates in a sequence for directing the forward edge 74 of the wrap 36 from the pinch point 60 toward the wrap path 52. The mechanism 76C includes previously identified components, including the infeed belt 56 and the rear feed roller 58. In a first step, the rear feed roller 58 is rotated counterclockwise (from the viewpoint of FIG. 9), as designated by arrow A4. As the pinch point 60 is partially defined by the rear feed roller 58, this rotation helps drive the wrap 36 through the pinch point 60. The rear feed roller 58 continues to rotate counterclockwise until a predetermined amount of wrap 36 has passed through the pinch point 60, such that the forward edge 74 of the wrap 36 rests on the infeed belt 56.

In a second step, as shown in FIG. 10, the rear feed roller 58 is rotated clockwise (from the viewpoint of FIG. 10), as designated by arrow A5. This drives the infeed belt 56 in the standard operating direction otherwise used to transfer cotton 12 from the accumulator 24 into the chamber 54 of the module builder 26. In the second step, the infeed belt 56 carries a small amount of additional cotton 12 (relative to the amount of cotton 12 in the chamber 54) from the accumulator 24 toward the chamber 54. The beater rolls may be actuated to deposit the additional cotton 12 on the belt 56. Alternatively, the additional cotton 12 may be deposited by the unwrapped module within the chamber 54. When the cotton 12 on the belt 56 contacts the forward edge 74 of the wrap 36, it pushes the wrap 36 toward and into contact with the first roller 50A, encircling a portion of the first roller 50A clockwise from the pinch point 60. Once the forward edge 74 of the wrap is past the roller 50A, the rear feed roller 58 and infeed belt 56 may shut off to stop moving cotton 12 from the accumulator 24 to the module builder 26.

The first roller 50A and belt 48 are then actuated, driving the wrap 26 along the wrap path 52. Alternatively, in some embodiments the first roller 50A doesn't stop rotating during this process. In either case, the mechanism 76C redirects the wrap 36 from the path designated by arrow A1 (FIG. 4) to the wrap path 52 (i.e., following arrow A2), reducing the possibility of the wrap 36 bunching prior to engaging the wrap path 52.

Any of the mechanisms 76A, 76B, and 76C may be used in combination with one another to further limit or remove the opportunity for the wrap 36 to bunch prior to engaging the wrap path 52. Further, the mechanisms 76A, 76B, 76C may be utilized for wrapping every module 38 or only some modules. For example, the mechanisms 76A, 76B, 76C may be utilized for only the first wrap 36 of each roll. Further, though shown with respect to a cotton harvester 10, the mechanisms 76A, 76B, 76C may be utilized with an alternative agricultural vehicle that includes a product wrap and product wrap delivery system.

Figure 11:
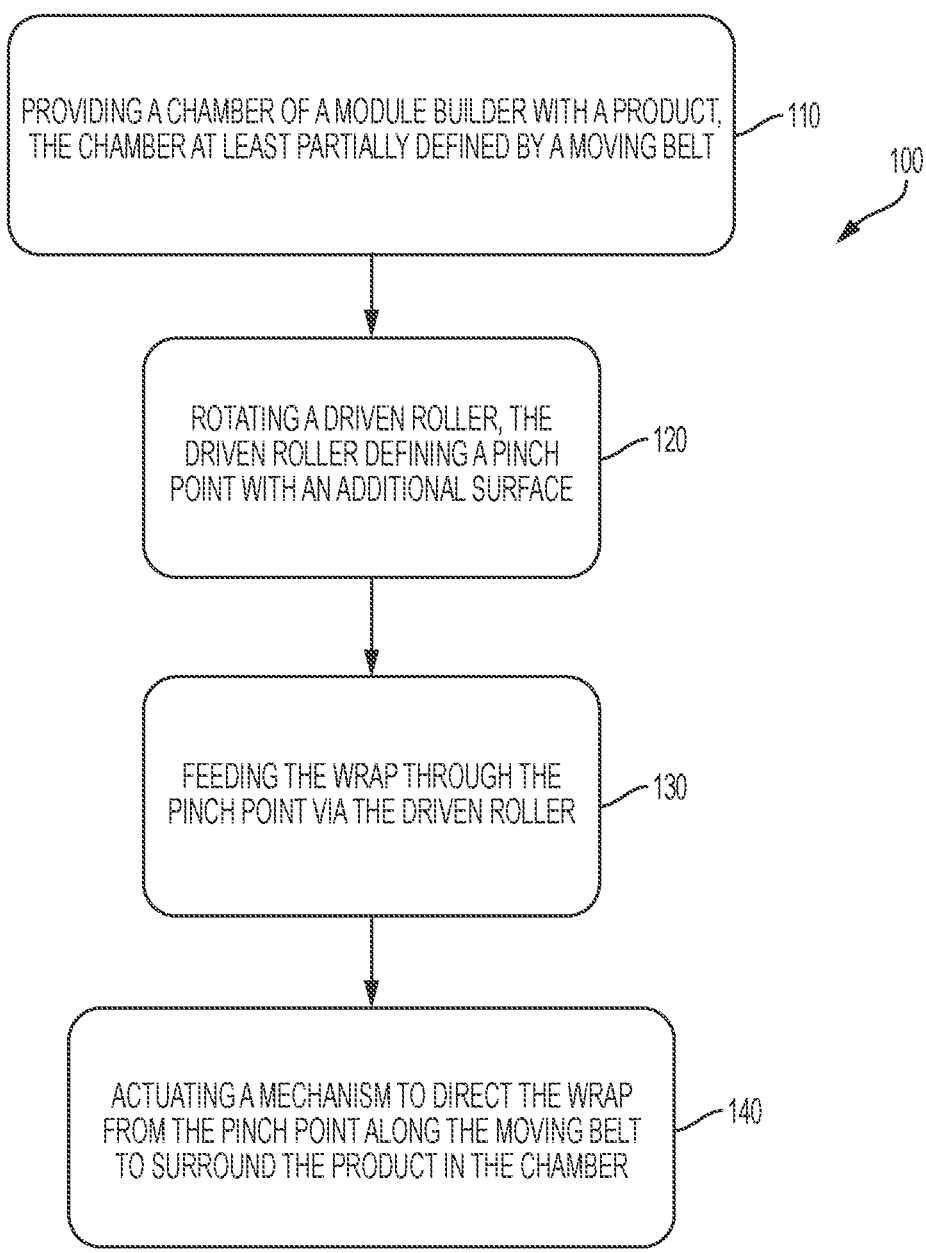
FIG. 11 is a flow diagram of a method of directing a wrap about a product in a chamber of a module builder.

The wrap 36 is directed about a product 12 in a chamber 54 of a module builder 26, with the assistance of a mechanism 76A, 76B, 76C, as outlined in the flow diagram 100 of FIG. 11. The chamber 54, which is at least partially defined by a moving belt 48, is provided with a product 12 (step 110). The driven roller 50A, which defines a pinch point 60 with an additional surface, is rotated (step 120), and the wrap 36 is fed through the pinch point 60 via the driven roller 50A (step 130). A mechanism 76A, 76B, 76C, as previously described, is actuated to direct the wrap 36 from the pinch point 60 along the moving belt 48 to surround the product 12 in the chamber 54 (step 140).

Various features of the disclosure are set forth in the following claims.

What is claimed is:

1. A module builder of an agricultural vehicle, the module builder comprising:
    a chamber operable to support and form a product;
    a wrap feedable into the chamber through a pinch point, the pinch point partially defined by a rotatable roller;
    a belt at least partially defining a wrap path, wherein the wrap is configured to move along the wrap path to surround the product in the chamber;
    a wrap transfer assembly configured to move between an engaged position and a disengaged position, wherein the wrap transfer assembly comprises a tray, and wherein, in the engaged position, the tray is spaced apart from the pinch point and is configured to press the wrap into engagement with the belt at a location spaced apart from the pinch point; and
    a gas flow system operable to direct the wrap from the pinch point toward the wrap path.

2. The module builder of claim 1, wherein the gas flow system is a vacuum device, and wherein the vacuum device is operable to adhere the wrap to a portion of the rotatable roller.

3. The module builder of claim 2, wherein a portion of the vacuum device is contained within the rotatable roller.

4. The module builder of claim 2, wherein the rotatable roller includes surface apertures in fluid communication with the vacuum device.

5. The module builder of claim 2, wherein a gas-permeable portion is defined by the belt to provide a flow path between the vacuum device and the chamber.

6. The module builder of claim 1, wherein the gas flow system includes a nozzle operable to direct a flow of gas toward the wrap.

7. The module builder of claim 6, further including a vacuum device operable to adhere the wrap to a portion of the rotatable roller.

8. The module builder of claim 6, wherein the nozzle is in fluid communication with a source of air at a pressure greater than atmospheric pressure.

9. The module builder of claim 1, wherein the belt is a first belt and wherein the module builder further comprises at least a portion of a second belt, the second belt rotatable about a plurality of rollers to direct the wrap from the pinch point toward the wrap path.

10. The module builder of claim 9, wherein the second belt is rotatable about the plurality of rollers to direct the wrap through the pinch point.

11. A method of directing the wrap about the product in a chamber of the module builder of claim 1, the chamber at least partially defined by the belt, the method comprising:
    introducing the product into the chamber;
    rotating the roller to feed the wrap in a first direction through the pinch point partially defined by the belt; and
    actuating the gas flow system to direct the fed wrap in a second direction toward the belt, the second direction different than the first direction.

12. The method of claim 11, wherein the second direction is greater than 90 degrees away from the first direction.

13. The method of claim 11, wherein actuating the gas flow system includes actuating a vacuum device, at least a portion of which is contained with the roller.

14. The method of claim 11, wherein actuating the gas flow system includes discharging a flow of air from a nozzle in fluid communication with a source of air, the source of air at a pressure greater than atmospheric pressure.

15. The method of claim 11, wherein introducing the product into the chamber includes moving a feed belt about a plurality of rollers in a first direction, and wherein the method further includes moving the feed belt about the plurality of rollers in a second direction opposite to the first direction.

16. The method of claim 15, wherein a portion of the belt and a portion of the feed belt define the pinch point.

17. An agricultural vehicle having the module builder of claim 1, the agricultural vehicle comprising:
    an accumulator operable to store the product; and
    a first belt operable to direct the product from the accumulator to the module builder,
    wherein the belt is a second belt operable to direct the product within the module builder;
    wherein the wrap is feedable between the pinch point, wherein the pinch point is further defined by the first belt and the second belt, and
    wherein the first belt is configured to move the wrap through the pinch point in a direction away from the second belt in a first mode of operation and is configured to move the wrap toward the second belt in a second mode of operation.

18. The module builder of claim 17, wherein the second belt is positioned to cooperate with the first belt to move the wrap through the pinch point in the first mode of operation.

19. The agricultural vehicle of claim 17, wherein in the second mode of operation, the first belt is operable to direct product from the accumulator to the module builder.

20. A module builder of an agricultural vehicle, the module builder configured to receive product at an inlet of the module builder via a feed belt at least partially defined by a first roller, the module builder comprising:
    a chamber operable to support and form a product;
    a wrap feedable into the chamber through a pinch point, the pinch point defined by the first roller and a second roller and distinct from the inlet of the module builder;
    a belt at least partially defining a wrap path, wherein the wrap is configured to move around the second roller and along the wrap path to surround the product in the chamber; and
    a gas flow system operable to direct the wrap from the pinch point toward the wrap path.

\* \* \* \* \*